United States Patent [19]

Seiler et al.

[11] 4,303,488

[45] Dec. 1, 1981

[54] ELECTROCOATING WITH WATER-BORNE COATING COMPOSITION MADE FROM EPOXY RESIN, POLYMERIC ACID AND TERTIARY AMINE

[75] Inventors: Henry K. Seiler, Woodbury, N.J.; Eugene G. Sommerfeld, Penn Valley, Pa.

[73] Assignee: E. I. Du Pont de Nemours and Company, Wilmington, Del.

[21] Appl. No.: 162,240

[22] Filed: Jun. 30, 1980

Related U.S. Application Data

[63] Continuation-in-part of Ser. No. 74,122, Sep. 14, 1979, Pat. No. 4,247,439, which is a continuation-in-part of Ser. No. 941,540, Sep. 15, 1978, abandoned, which is a continuation-in-part of Ser. No. 767,388, Feb. 10, 1977, abandoned, which is a continuation-in-part of Ser. No. 581,094, May 27, 1975, abandoned, which is a continuation-in-part of Ser. No. 413,372, Nov. 6, 1973, abandoned.

[51] Int. Cl.$^3$ .............................................. C25D 13/00
[52] U.S. Cl. ................................................. 204/181 R
[58] Field of Search ......................... 204/181 R, 181 A

[56] References Cited

U.S. PATENT DOCUMENTS

| | | | |
|---|---|---|---|
| 2,676,166 | 4/1954 | Webers | 526/79 |
| 2,895,930 | 7/1959 | Yuseum | 260/21 |
| 2,991,260 | 7/1961 | Auer et al. | 260/22 |
| 3,331,805 | 7/1967 | Mandel | 260/834 |
| 3,338,860 | 8/1967 | Vasta | 260/834 |
| 3,403,088 | 9/1968 | Hart | 204/181 |
| 3,419,525 | 12/1968 | Aelony | 260/37 R |
| 3,468,816 | 9/1969 | Thompson et al. | 260/18 R |
| 3,845,066 | 10/1974 | Vasta | 260/29.6 WB |
| 3,847,849 | 11/1974 | Lackner | 204/181 R |
| 3,908,049 | 9/1975 | Fitko | 260/29.4 UA |
| 3,933,611 | 1/1976 | Dudley | 204/181 R |
| 3,943,187 | 3/1976 | Wu | 260/29.6 NR |
| 3,962,060 | 6/1976 | Brasko et al. | 204/181 R |
| 3,962,165 | 6/1976 | Bosso et al. | 260/29.2 EP |
| 3,969,300 | 7/1976 | Nagata et al. | 260/29.4 UA |
| 3,997,694 | 12/1976 | Wu | 428/35 |
| 4,021,396 | 5/1977 | Wu | 260/29.6 NR |
| 4,069,210 | 1/1978 | Schimmel | 260/29.2 EP |
| 4,076,675 | 2/1978 | Sommerfeld | 260/29.4 |
| 4,076,676 | 2/1978 | Sommerfeld | 260/29.4 |
| 4,094,760 | 6/1978 | Smith et al. | 204/181 C |
| 4,113,682 | 9/1978 | Nagata et al. | 204/181 R |
| 4,126,596 | 11/1978 | Schimmel et al. | 260/29.6 NR |

FOREIGN PATENT DOCUMENTS

| | | | |
|---|---|---|---|
| 804928 | 3/1974 | Belgium . | |
| 732653 | 4/1966 | Canada | 260/29.6 NR |
| 6334 | 1/1980 | European Pat. Off. . | |
| 921622 | 3/1963 | United Kingdom . | |

OTHER PUBLICATIONS

Derwent Abstract 61871 (BE863937) "Thermosetting Aq. Coating Comp.", 8/14/78, Du Pont.

*Primary Examiner*—Maurice J. Welsh

[57] ABSTRACT

Water-borne reaction products of (a) carboxyl-functional polymers; (b) polyepoxides; and (c) tertiary amines are electrocoated to give desirable coatings. The coating compositions can be used with or without crosslinking agents and coalescing aids. The resulting coatings give improved properties, including high degree of flexibility during machining and stamping of the coated articles, corrosion resistance, gloss, hydrolytic stability, and are stable and nonadulterating in contact with foods and beverages.

10 Claims, No Drawings

ELECTROCOATING WITH WATER-BORNE COATING COMPOSITION MADE FROM EPOXY RESIN, POLYMERIC ACID AND TERTIARY AMINE

CROSS-REFERENCE TO RELATED APPLICATIONS

This application is a continuation-in-part of application Ser. No. 074,122, filed Sept. 14, 1979, now U.S. Pat. No. 4,247,439, granted Jan. 27, 1981, which in turn is a continuation-in-part of application Ser. No. 941,540, filed Sept. 15, 1978, and now abandoned, which in turn is a continuation-in-part of application Ser. No. 767,388, filed Feb. 10, 1977, and now abandoned, which in turn is a continuation-in-part of application Ser. No. 581,094, filed May 27, 1975, and now abandoned, which in turn is a continuation-in-part of application Ser. No. 413,372, filed Nov. 6, 1973, and now abandoned.

BACKGROUND OF THE INVENTION

This invention relates to coating compositions based on water-borne reaction product of a carboxyl-functional polymer, an epoxide, and a tertiary amine having general utility in electrocoating metallic substrates. It is more particularly directed to coating compositions useful as can coatings for interior and exterior surfaces of cans and for metal sheet stock.

It is known (U.S. Pat. No. 3,962,060—Brasko et al., 1976 and U.S. Pat. No. 3,933,611—Dudley, 1976) that electrocoating is an excellent method of applying a water-based coating to a continuous coil of metal sheet stock. With conventional coatings, the application technique limit the speed of the coating line generally to a maximum 500-600 ft/min. However, with electrocoating as a means of application, it has been demonstrated that this is not the case. Line speeds above 1000 ft/min are feasible. Other advantages of electrodeposition over other methods such as roller coating for continuous coil application are (1) elimination of the need for coil flattening and straightening before coating to obtain uniform coating build and continuity; (2) pretreatment and pretreatment ovens are not needed; (3) more uniform film coverage so that lower film weights are possible; (4) less solvent emission from ovens and less heat needed for ovens because of low amount of solvent and water in unbaked film; and (5) faster curing times because amine and water are removed during electrodeposition.

It is also known (U.S. Pat. No. 4,094,760—Smith et al., 1978) that electrodeposition is an excellent method of applying water-based coatings to the interior and exterior surfaces of metal containers. There are many advantages to using electrocoating, with the most important being that much lower coating weights can be used.

The electrocoating of metal stock or cans discussed above requires very special resin compositions. The short coating times, in the order of milliseconds to seconds, requires resin systems with high equivalent weights for high coulomb yields so that proper coating weights can be obtained in these short coating times without very high current densities and corresponding electrical power requirements. (A. H. Bushey, Journal of Coating Tech, Vol. 48, No. 619, August, 1976).

Some other requirements of the resin system are (1) short curing times, (2) the proper hardness of the electrocoating film before baking since the unbaked coating in some cases is in contact with rollers or is wiped with a squeegee, and (3) the cured coatings must meet several requirements such as not imparting taste to or subtracting taste from the contents of containers, adequate ease of formability and the ability to go through pasturezation or sterilization conditions.

There are very few conventional electrocoating resin systems that fulfill all of the requirements stated above. The conventional resins are usually low in molecular weight or low in Tg (glass transition temperature) to provide adequate flow requirements during electrocoating and cure. These resins usually require long baking times to obtain proper crosslinked films and also because of their low molecular weights they have low coulomb yields and are too soft in the unbaked state.

SUMMARY OF THE INVENTION

It is, therefore, an object of this invention to provide an improved electrocoating process for applying a water-borne composition that meets the requirements mentioned above. According to the present invention, there is provided a process of electrocoating an electrically-conductive surface serving as an anode which comprises passing electric current between said anode and a cathode in contact with an aqueous electrodepositable composition, the improvement wherein said electrodepositable composition comprises a water-borne coating composition consisting essentially of liquid carrier and the reaction product of:

(A) not less than 50% by weight, based on the weight of (A) plus (B), of an epoxy resin containing, on the average, two terminal 1,2-epoxy groups per molecule and having an epoxy equivalent weight of 750-5000, preferably about 1500-4000, most preferably about 3000;

(B) a carboxyl-functional polymer in an amount sufficient to provide at least 1.25, preferably at least about 1.75, most preferably about 4.6, equivalents of carboxyl groups, when the source of the carboxyl group is a mono-protic acid, and at least 2.0 equivalents of carboxyl groups, when the source of such groups is a diprotic acid, per equivalent of 1,2-epoxy groups in the epoxy resin of (A), said polymer having a weight average molecular weight (determined by light scattering) of 5000-160,000, preferably about 10,000-80,000, most preferably about 13,000-18,000, and an acid number of 100-500, preferably about 150-350, most preferably about 300;

(C) an aqueous solution of at least 1.25, preferably at least about 1.75, most preferably about 2.0, equivalents of a tertiary amine per equivalent of 1,2-epoxy groups in the epoxy resin of (A), said tertiary amine being selected from the group consisting of $R_1R_2R_3N$, pyridine, N-methyl pyrrole, N-methyl piperidine, N-methyl pyrrolidine, N-methyl morpholine, and mixtures therein and wherein $R_1$ and $R_2$ are substituted or unsubstituted monovalent alkyl groups containing one or two carbon atoms in the alkyl portion and $R_3$ is a substituted or unsubstituted monovalent alkyl group containing 1-4 carbon atoms;

(D) Y is at least about $6+0.75 (2^x)$ wherein Y is the milliequivalent of carboxyl groups neutralized by primary, secondary or tertiary amine or monofunctional quaternary ammonium hydroxide per 100 grams of acid polymer plus epoxy, and X is the epoxy equivalent weight divided by 1000; and (E) optionally, 10–90% of the amount required for stoichiometric reaction with the carboxyl-functional polymer of (B) of at least one primary, secondary or tertiary amine or monofunctional quaternary ammonium hydroxide;

wherein for increasing ratios of carboxyl groups to 1,2-epoxy groups, the amount of amine is increased to keep the carboxyl-functional polymer water dispersible.

Preferably, the components (A), (B) and (C) are capable of forming a hydrogel structure with components (A), (B) and (C) comprising about 1–20%, preferably 5–10% of the coating composition and the remainder comprising water and, optionally, organic liquid(s) in a volume ratio of from 90:10 to 95:5 to all water. (percentages, proportions and ratios herein are by weight except where indicated otherwise.)

The water-borne coating composition of the invention can be crosslinked without the addition of a crosslinking or, optionally, it can contain crosslinking agents such as a nitrogen resin or a phenolic resin. Coalescing aids are desirable, and additives commonly utilized in coating compositions such as pigments, fillers, UV absorbers, and the like can be used.

DESCRIPTION OF THE INVENTION

Coating compositions disclosed and claimed in U.S. Patent Application Ser. No. 074,122 filed Sept. 14, 1979, now U.S. Pat. No. 4,247,439, granted Jan. 27, 1981, incorporated herein by reference, can be used in the process of the present invention.

Conventional electrocoating processes tend to use low molecular weight resins to enhance flow and coalescence of the film as coated and as cured. However, such resins deposit and cure relatively slowly. The present invention permits the use of relatively high molecular weight resins with a low amine content for efficient electrodeposition. Coalescing aids can improve the integrity of the film as initially deposited and during cure. Crosslinking agents can act to some extent as coalescing aids and do help further to provide proper baked film properties.

The water-borne coating composition used in the present invention is a solution or dispersion of the reaction products of an epoxy resin, a tertiary amine, and a carboxyl-functional polymer. By mixing these components in a random order and utilizing aqueous solutions of highly specific tertiary amines such as dimethyl ethanol amine, a stable, water soluble or dispersible salt of a polymeric quaternary ammonium hydroxide and a carboxylfunctional polymer results which can be crosslinked without the addition of external crosslinking agents. The optional addition of an external crosslinking agent, such as a nitrogen resin, also affords a crosslinkable solution or dispersion which is stable at room temperature. Both compositions, the salt and the solution or dispersion containing an external crosslinking agent, are infinitely dilutable with water.

Whether the coating composition is a solution or a dispersion is largely dependent on the nature of the particular amine used, the stoichiometry of the system, and the epoxy equivalent weight. Even when the composition is opaque some of the resinous components may be dissolved, and when the composition appears to be a clear solution it is possible that small amounts of the components are in a dispersed state. For sake of simplicity, hereafter the term "dispersion" will be used to denote the water-borne coating composition.

The dispersion, with or without an external crosslinking agent, as prepared, usually has a pH of about 7 and a nonvolatile content of up to 50%, preferably up to 20% as used for electrodeposition. Upon drying, a hard, solvent-resistant film having excellent resistance to acids, bases, hot water, and detergent results.

The low molecular weight epoxy resins to be utilized in the present invention are commonly known in the art. One class of such resins has the generalized formula

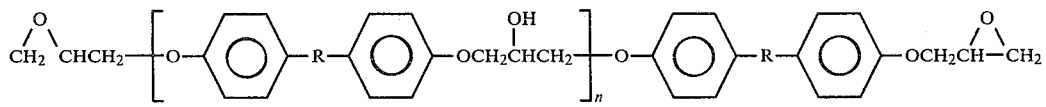

wherein R is an alkylene group of 1–4 carbon atoms and n is an integer from 1–12. The epoxy resins utilized in this invention contain an average of two terminal 1,2-epoxy groups per molecule and are in the epoxy equivalent weight range of 750–5000, preferably 1500–4000. They can also contain substituted aromatic rings.

One such preferred epoxy resin is Epon ® 1004 sold by Shell Chemical Co. where R is isopropylidene, the average value of n is 5, having an epoxy equivalent weight of 875–1025, with an average of about 950±50. The epoxy equivalent weight is defined as the grams of resin containing 1 gram-equivalent of epoxide as measured by ASTM-D-1652. The coating composition containing "Epon 1004" affords a glossy, flexible, chemically-resistant film. Another preferred epoxy resin is "Epon 1007" where R is isopropylidene, the average value of n is 11, having an epoxy equivalent weight of 2000–2500, with an average of about 2175±50. The coating composition containing "Epon 1007" affords glossy, tough, flexible films upon cure. Another preferred epoxy is an analog of "Epon 1009" with an average epoxy equivalent weight of 3000 made by chain extending "Epon 829" eq. wt. with bisphenol A.

The quantity of the epoxy resin to be utilized in the coating composition of this invention is determined in relation to the amount of carboxyl-functional polymer and the relative amounts are dependent on the end use application of the coating but there must be at least 50%, preferably in the range of 65–90%, of epoxy resin present. There must be, furthermore, at least 1.25, preferably at least 1.75, and most preferably about 2.0, equivalents of carboxyl groups per equivalent of 1,2-epoxy groups in the epoxy resin. This minimum equivalent requirement is valid for those carboxyl-functional polymers which contain monoprotic acids derived from alpha,beta-ethylenically unsaturated acid monomers such as acrylic acid, methacrylic acid, monoesters of alkanols having 1–8 carbon atoms with diacids, such as maleic acid, itaconic acid, fumaric acid, mesaconic acid, citraconic acid and the like, and mixtures thereof. For those carboxyl-functional polymers which contain diprotic acids derived from diacids such as maleic acid, itaconic acid, fumaric acid, mesaconic acid, citraconic acid, and mixtures thereof, the minimum requirement is 2.0 equivalents, preferably at least 2.5 equivalents, of carboxyl group per 1,2-epoxy groups. Usually, no more than 10.0, and preferably no more than 6.0, equivalents of carboxyl groups, per equivalent of 1,2-epoxy groups, will be present.

The carboxyl-functional polymers utilized in this invention are prepared by conventional free radical polymerization techniques from at least one ethylenically unsaturated monomer and at least one ethylenically unsaturated acid monomer. The choice of the alpha,beta-unsaturated monomer(s) is dictated by the intended end use of the coating composition and is practically unlimited. A variety of acid monomers can be used; their selection is dependent on the desired final polymer properties.

This acid monomer can be ethylenically unsaturated acid, mono-protic or diprotic, anhydride or monoester of a dibasic acid, which is copolymerizable with the other monomer(s) used to prepare the polymer.

Illustrative monobasic acids are those represented by the structure

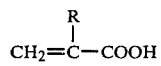

where R is hydrogen or an alkyl radical of 1-6 carbon atoms.

Suitable dibasic acids are those represented by the formula

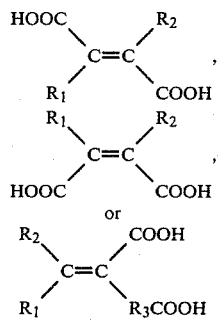

where $R_1$ and $R_2$ are hydrogen, an alkyl radical of 1-8 carbon atoms, halogen, cycloalkyl of 3-7 carbon atoms or phenyl, and $R_3$ is an alkylene radical of 1-6 carbon atoms. Half-esters of these acids with alkanols of 1-8 carbon atoms are also suitable.

The most preferred acid monomers are acrylic acid, methacrylic acid, and itaconic acid.

The acid number of the polymers is 100-500, which corresponds to concentrations of about 10-77% of the acid monomers by weight of the polymer. The acid number is the number of milligrams of potassium hydroxide required to neutralize one gram of the polymer. For purposes of illustration, an acid number of 100 corresponds to the presence in the polymer of either 12.8% acrylic acid, 15.3% of methacrylic acid, 11.5% of itaconic acid, or 10.3% of maleic or fumaric acid. An acid number of 500 corresponds to 64% of acrylic acid, 76.5% of methacrylic acid, 57.5% of itaconic acid, or 51.5% of maleic or fumaric acid in the polymer. Preferred acid number values are 150-350.

Vinyl aromatic monomers are commonly utilized to be copolymerized with the acid monomers. They are represented by the structure:

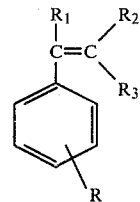

where R, $R_1$, $R_2$, and $R_3$ are hydrogen or an alkyl radical of 1-5 carbon atoms. Illustrative of these monomers are styrene, α-methyl styrene, vinyl toluene, and the like. The best polymers, in terms of final film properties, are those in which this type of monomer is styrene. The vinyl aromatic monomers can be present from 0-80% of the carboxyl-functional polymer, preferably from 40-80%, most preferably from 40-70%, and specifically at concentrations of about 42, 53, and 66%. For some purposes 10-45% may be preferred and, in some applications, the polymer contains no such monomer.

Other commonly utilized monomers are the α,β-unsaturated nitriles represented by the structure:

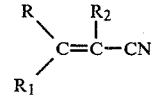

where R and $R_1$ are hydrogen, an alkyl radical of 1-18 carbon atoms, tolyl, benzyl or phenyl, and $R_2$ is hydrogen or methyl. Most commonly utilized are acrylonitrile and methacrylonitrile. The nitrile monomer can be present from 0-40% based on the carboxyl-functional polymer. The polymers preferably contain 10-30% and more preferably 18-22% of the polymer, of the nitrile monomer. For certain purposes it may be desirable to use 5-10% of the nitrile monomer and in some cases no such monomer is included in the polymers.

Other suitable monomers are esters of acrylic acid, methacrylic acid or mixtures thereof with $C_1$-$C_{16}$ alkanols. Preferred esters are the methy, ethyl, propyl, n-butyl isobutyl, and 2-ethylhexyl esters of acrylic acid or methacrylic acid or mixtures of such esters. These esters can be present in concentrations of 0-97%, preferably 50-90% for automotive finishes and coil coatings and, for can coatings and appliance finishes, preferably 0-50%.

One can also utilize hydroxylalkyl(meth)acrylate monomers such as hydroxyethyl acrylate, hydroxypropyl acrylate, hydroxyethyl methacrylate, hydroxypropyl methacrylate or mixtures thereof. Up to 20% of such ester(s) can be incorporated.

It may be desirable, for certain uses, to include in the polymer acrylamide, methacrylamide or an N-alkoxymethyl(meth)acrylamide such as N-isobutoxymethyl(-meth)acrylamide. Alternatively, a polymer containing copolymerized acrylamide or methacrylamide can be post-reacted with formaldehyde and an alkanol to produce an N-alkoxymethylated polymer.

Choice of the particular monomers to be utilized is made with respect to the end use of the coating composition. Preferred polymer compositions include: styrene/acrylonitrile/α,β-ethylenically unsaturated acid//45-84/10-30/15-54, for can coating; styrene/acrylonitrile/alkyl(meth)acrylate/α,β-ethylenically unsaturated acid//30-60/10-30/10-50/15-54, for can coatings and appliance finishes; styrene/alkyl(meth)acrylate/α,β-ethylenically unsaturated acid//20-70/10-60/15-54 or, even more preferably, 35-60/30-50/15-54, for automotive topcoats and primers; methyl methacrylate/alkyl(meth)acrylate/α,β-ethylenically unsaturated acid//20-40/30-74/15-54, for automotive and coil coating applications. Any of the above can also include hydroxyalkyl(meth)acrylate and/or (meth)acrylamide. The alkyl group of the alkyl(meth)acrylate monomer is preferably ethyl, n-butyl, iso-butyl or 2-ethyl-hexyl.

The carboxyl-functional polymers can be prepared by polymerizing suitable monomers, in proper amounts, in an organic liquid medium. In general, this liquid is an organic liquid capable of medium hydrogen bonding, or a combination of this liquid with less than about 50% of an organic liquid capable of strong hydrogen bonding.

Preferably, the liquid medium for the polymerization is an alcohol mixture, generally 62% butanol and 38% of butyl cellosolve. Other media which could be used include either water-soluble or insoluble ketone. Optionally, the ketone can also contain less than about 50% of an ethylene glycol- or diethylene glycol monoalkyl ether (where the alkyl group contains 1–4 carbon atoms), or diacetone alcohol, and/or an alkanol of 1–4 carbon atoms or an alkanediol of 1–7 carbon atoms. A preferred medium is methyl ethyl ketone used by itself. Another preferred medium for the polymerization is a mixture of methyl ethyl ketone and ethylene glycol monobutyl ether.

A catalyst or polymerization initiator is ordinarily used in the polymerization of the carboxyl-functional polymers, in the usual amounts. This can be any free radical initiator that decomposes with a half-life of 0.5 to 2.5 hours at the reflux temperature of the organic liquid medium being used. Tertiary butyl perbenzoate, tertiary butyl peroxypivalate, and tertiary butyl peroxyisobutyrate are preferred.

The polymers utilized in the water-borne coating composition of this invention have a weight average molecular weight, as determined by light scattering or, more conveniently, gel permeation chromatography, using a polystyrene standard, calibrated by light scattering methods of about 5,000–160,000. The preferred weight average molecular weight range is 5,000–80,000. For some applications a 13,000–18,000 molecular weight is preferred.

During the preparation of the coating composition of this invention, an aqueous solution of a tertiary amine, specified below, is brought in contact with a solution of an epoxy resin in organic liquid(s) or with a solution of an epoxy resin and a carboxyl-functional polymer. A wide variety of organic liquids can be used to dissolve the epoxy resins and the carboxyl-functional polymers. Among the most commonly used solvents are alcohols such as isopropanol, the butyl alcohols, 2-hydroxy-4-methyl-pentane, 2-ethylhexyl alcohol, cyclohexanol, glycols such as ethylene glycol, diethylene glcyol, 1,3-butylene glycol, ether alcohols such as ethylene glycol mono-ethyl ether, ethylene glycol mono-butyl ether, diethylene glycol mono-methyl ether, mixtures thereof, and many aliphatic and aromatic hydrocarbons if used admixed with at least one of the above.

While the exact mode of the reaction is not fully understood, it is believed that the tertiary amine first reacts with the carboxyl-functional polymer to form the corresponding salt which, in turn, can dissociate to allow the amine to react with the 1,2-epoxy groups of the epoxy resin. It is also possible, however, that the tertiary amine reacts directly with the 1,2-epoxy groups. In either case, the resulting quaternary ammonium hydroxide can react with the carboxyl-functional polymer to yield a polymeric quaternary ammonium-amine mixed salt of a polymeric acid.

The reaction of tertiary amines with materials containing epoxy groups, to yield adducts containing quaternary ammonium groups, is known. Such reaction, when carried out in presence of water, can afford a product that contains both a hydroxyl group and a quaternary ammonium hydroxide. The reaction can be represented schematically as follows:

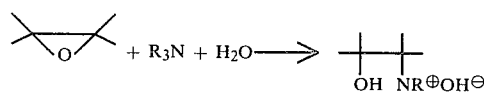

While most tertiary amines react with epoxy resins to form quaternary ammonium hydroxides, the preparation of the water-borne coating composition of this invention is carried out utilizing at least one tertiary amino selected from the group; $R_1R_2R_3N$, N-methyl pyrrolidine, N-methyl morpholine, pyridine, N-methyl pyrrole, N-methyl piperidine, and mixtures thereof, wherein $R_1$ and $R_2$ are substituted or unsubstituted monovalent alkyl groups containing one or two carbon atoms in the alkyl portion and $R_3$ is a substituted or unsubstituted monovalent alkyl group containing 1–4 carbon atoms. Some examples of $R_1R_2R_3N$ are: trimethyl amine, dimethyl ethanol amine (also known as dimethyl amino ethanol), methyl diethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, and mixtures thereof. Most preferably trimethyl amine or dimethyl ethanol amine is used.

The generation of a polymeric quaternary ammonium hydroxide which is water soluble or dispersible when in presence of a nitrogen resin crosslinking agent is described in U.S. Pat. No. 4,076,676, granted Feb. 28, 1978, and its relevant portions are hereby incorporated by reference.

The amount of tertiary amine needed in the preparation of the water-borne coating composition of this invention is determined by two factors. As a minimum, there is required at least 1.25 equivalents of tertiary amine per equivalent of 1,2-epoxy groups, preferably at least 1.75 equivalents, more preferably 2.0, for the formation of stable dispersions. As the ratio of the number of carboxyl groups in the carboxyl-functional polymer to the number of 1,2-epoxy groups in the epoxy resin increases, the amount of amine is also increased to keep the carboxyl-functional polymer water dispersible. This excess amine is believed to form a salt with some or all of the excess carboxyl groups of the polymer. It is preferred that no excess amine, over the total number of equivalents of carboxyl groups, be used in the coating composition of this invention. The amine utilized in excess of the 1.25 equivalents of the highly specific tertiary amine per equivalent of 1,2-epoxy groups need not be the same as, nor does it necessarily have to be selected from the group of the highly specific tertiary amines. Any primary, secondary or tertiary amine or monofunctional quaternary ammonium hydroxide can be utilized in neutralizing carboxyl groups of the carboxyl-functional polymer which are not already neutralized. Among such tertiary amines are included: triethyl amine, diethyl ethanol amine, dimethyl cyclohexyl amine, triethanol amine, tributyl amine, dimethyl n-butyl amine, tripropyl amine, dimethyl lauryl amine, and γ-picoline. Primary and secondary amines preferably should not be used along with tertiary amines in the neutralization of the epoxies because unwanted covalent bonds could be formed, and this can interfere with the desired hydrogel formation.

For electrodeposition, it is preferred that the amount of excess amine that forms a salt with the carboxyl groups be as close as possible to the minimum required to provide water dispersibility and a stable system. This insures that the coulomb yield will be high. An equation can be used to estimate coulomb yield in reference to the amine-carboxyl content of the system:

$$Z = 1036/Y$$

where $Z$ is the coulomb yield in milligrams of baked film per coulomb of electrical current and $Y$ is the milliequivalent of carboxyl groups neutralized with primary, secondary or tertiary amine per 100 grams of acid polymer plus epoxy.

The water-borne coating composition of this invention can be prepared without regard to the sequence of addition of the various components. It is preferred, however, to first dissolve the epoxy resin in the carboxyl-functional polymer, in presence of suitable organic liquids. Addition of a suitable tertiary amine, usually dissolved in water, completes the preparation of the polymeric quaternary ammonium salt of a polymeric acid. Additional water can then be added to achieve the final volume ratio of water and organic liquid of from 95:5 preferably to 90:10. Additional amine can also be added to insure dispersibility.

A preferred ratio of tertiary amine to water is approximately 1:5 by weight.

The reaction can be carried out between room temperature and below the boiling point of the reaction medium, preferably between 50°–100° C., most preferably 90°–100° C. In this temperature range there is a rapid rate of reaction.

In another preferred method of preparation of the coating composition, an epoxy resin is dissolved in a suitable organic liquid such as the mono-butyl ether of ethylene glycol or diethylene glycol, followed by the addition of a suitable tertiary amine. After the formation of the polymeric quaternary ammonium hydroxide is substantially complete, a carboxyl-functional polymer, dissolved in a suitable organic liquid is mixed with it with agitation. This latter solution can also contain any additional primary, secondary or tertiary amine, dissolved in water, necessary for dispersibility of the coating composition. Mixing of the components completes the preparation of the water-borne coating composition. This sequence of steps can also be carried out between room temperature and temperatures below the boiling point of the reaction media.

Yet another preferred method of preparation comprises the steps of dissolving the carboxyl-functional polymer in a suitable organic liquid, addition of an aqueous solution of a suitable tertiary amine, mixing in of an epoxy resin, and heating, preferably between 50°–100° C. and, more preferably, between 90°–100° C., followed by the requisite amount of water to obtain the final water-to-organic liquid volume ratio.

The polymeric quaternary ammonium-amine mixed salt of the carboxyl-functional polymer of the water-borne coating composition of this invention preferably is a complex hydrogel structure. It is the generation, during the epoxy/carboxyl/amine reaction, of such a hydrogel structure which affords the solubility or dispersibility, and stabilization, in water of the coating composition. A possible schematic formula is shown by the formula below. The exact nature of the bonding is not known. The number of carboxyl groups in the schematically shown polymer molecules and of the relative portion of free acid groups to the amine salt groups are determined by the stoichiometry employed during the preparation of the coating composition. The schematic representation is shown to further the understanding of the nature of the invention:

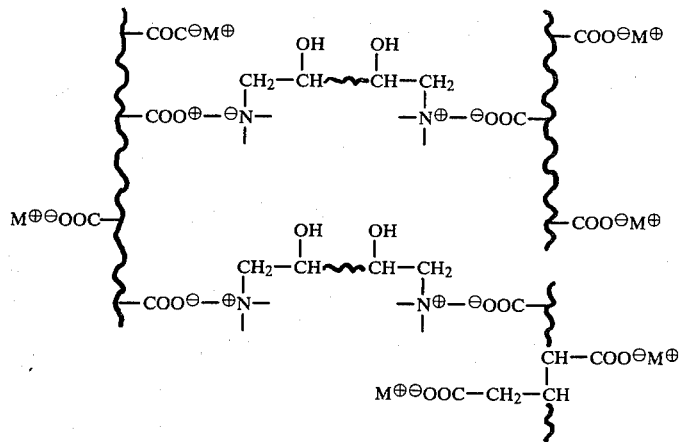

where $M^\oplus$ is hydrogen or a protonated primary, secondary or tertiary amine or a monofunctional ammonium group and

is formed from a tertiary amine selected from the group: $R_1R_2R_3N$, N-methyl pyrrolidine, N-methyl morpholine, pyridine, N-methyl pyrrole, N-methyl piperidine, and mixtures thereof, wherein $R_1$ and $R_2$ are substituted or unsubstituted monovalent alkyl groups containing one or two carbon atoms in the alkyl portion and $R_3$ is a substituted or unsubstituted monovalent alkyl group containing 1–4 carbon atoms.

The water-borne coating composition of this invention is a stable solution or dispersion and can be used as prepared. It can be crosslinked without the addition of an external crosslinking agent and can preferably be crosslinked with external crosslinking agents such as phenol formaldehyde resins or, preferably, nitrogen resins.

The nitrogen resins are well known. They are the alkylated products of amino-resins prepared by the condensations of at least one aldehyde with at least one of urea, N,N'-ethyleneurea, dicyandiamide, and aminotriazines such as melamines and guanamines. Among the aldehydes that are suitable are formaldehyde, revertible polymers thereof such as paraformaldehyde, acetaldehyde, crotonaldehyde, and acrolein. Preferred are formaldehyde and revertible polymers thereof. The amino-resins are alkylated with at least one and up to and including six alkanol molecules containing 1–6 carbon atoms. The alkanols can be straight chain, branched or cyclic.

Among the preferred nitrogen resins are partially methylated melamines, partially butylated melamines, hexaethoxymethylmelamine, hexamethoxymethylmelamine, dimethoxytetraethoxymethylmelamine, dibutoxytetramethoxymethylmelamine, butylated benzoguanamine, partially methylated urea, fully methylated urea, fully butylated urea, hexabutoxymethylmelamine, and mixtures thereof. The commercially available preferred nitrogen resins include the following products of American Cyanamid Co.:

Cymel ® 303   highly methylated melamine
Cymel ® 1116   highly methylated and ethylated melamine
Cymel ® 1130   highly butylated melamine
Cymel ® 1156   highly butylated melamine
Cymel ® 1123   highly methylated and ethylated monomeric benzoguanamine
Cymel ® 1125   methylated and ethylated polymeric benzoguanamine
Cymel ® 1133   methylated and ethylated polymeric benzoguanamine
Beetle ® 80   highly butylated urea formaldehyde These nitrogen resins can be blended directly into the coating composition at the completion of the preparation or before final dilution with water, either as a solid or as a solution in some miscible organic liquid.

The nitrogen resins are ordinarily added to the compositions of the invention at concentrations ranging from 5 to 50%, preferably 8 to 20%, even more preferably 10 to 15%. The exact amount will be dictated primarily by the final properties desired of the composition and can be determined by one skilled in the art.

For the electrocoating processes of the present invention, it is desirable to use high boiling, at least partly water soluble coalescing aids such as ethylene glycol monohexyl ether such as hexyl Cellosolve ®, sold by Union Carbide Corp., 2-ethyl hexanol, cyclohexanol or butanol in amounts which give adequate film coalescence on deposition and curing of the film. This will depend on several factors including the composition. It is also known that such coalescing solvents provides improved film continuity as measured by an enamel rater, see U.S. Pat. No. 3,939,110—Colbert et al (1976).

In the claims, the term "consisting essentially of" means not including other ingredients in amounts which change the basic and novel characteristics of the invention, including providing an aqueous acid-polymer-modified epoxy coating composition that can form a hydrogel and is useful as an interior coating for cans. Other commonly utilized additives such as coalescing aids, flow-control agents, plasticizers, pigments and the like can be added, in the usual amounts, if this appears necessary or desirable.

The water-borne composition can be applied to a variety of substrates known in industry. For example, the coating composition of this invention can be utilized in the can manufacturing industry which utilizes mainly metallic cans, many of them cylindrical, made from aluminum, tin-free steel, electrolytic tin-plate, and quality-as-rolled steel, among others. Cans utilized for packaging and shipping food and beer or other beverages are mostly of the three-piece or the two-piece drawn-and-ironed (D and I) variety. Cans constructed from three pieces (body, top and bottom) can be electrocoated before the metallic sheet is formed into the body of the can or can be electrocoated after partial fabrication. The D and I cans, where the metal sheet is stamped to form a cylindrical body closed at one end, can be electrocoated.

In the electrodeposition process the water-borne composition is placed in contact with an electrically conductive cathode and an electrically conductive anode, with the surface to be coated being the anode. During the process an adherent film is deposited at the anode. The substantial lack of film formation at the cathode is thought to be due to the preferential dissociation of the amine salt of the carboxyl groups over the polymeric quaternary ammonium salt of the carboxyl groups. It is believed that both electronic and steric factors are involved in the control of the dissociation. The negatively charged carboxylate anion migrates to the anode. The nitrogen resin crosslinking agent, if present in the coating composition, also migrates, in a possible physical entanglement with the polymeric quaternary ammonium salt of the carboxylfunctional polymer, to the anode.

In the electrocoating processes of the invention, the pH is normally and preferably about in the range of 7–10. The coating composition will tend to kick out of suspension if the pH becomes acidic. Above a pH of about 10, the composition can become too stable to deposit readily. Also, it would tend to absorb $CO_2$ from the air, leading to undesirable results. During coating, the pH is desirably maintained near that of the original composition as amine is released during the deposition. This can be done by adding resin with an amine content lower than that of the electrocoating bath, known as an underneutralized feed, or by the use of other conventional techniques such as ultrafiltration or flushed cathodes.

The conditions under which the electrocoating is carried out are similar to those used in the electrodeposition of other types of coatings. The applied voltage can be varied, can range from 1 to 1000 volts, and is typically between 25 and 500 volts. The current density is usually between about 0.1 milliampere and 1000 milliamperes per square centimeter. The current density tends to decrease during the coating process as the coating thickness increases. The coating time can vary from 0.1 to 120 seconds or longer and is typically between 0.3 and 5 seconds for coating cans.

Electrocoating techniques and apparatus known in the art can be used including those of the above-mentioned U.S. Pat. Nos. 3,933,611, 3,962,060 and 4,094,760.

The solids concentration of the coating composition depends upon the process parameters to be used and is not generally critical. Ordinarily the film-forming components comprise 1–20%, and preferably 5–10%, for electrodeposition, of the total composition, the remainder being water and organic liquid(s). The latter are present in a volume ratio of from 95:5 preferably to 90:10.

The freshly deposited films are capable of being immediately dried and/or crosslinked.

The coating compositions of this invention can be dried to useful films as is or can be cured thermally as is or when containing, for example, a nitrogen resin crosslinking agent. After the composition has been applied to the substrate, baking at elevated temperatures brings about the desired crosslinking. Temperatures of 150° C. to 300° C. for 1 second or less to 30 minutes, are typical baking schedules utilized.

The water-borne coating composition of this invention is useful in a variety of applications. This coating composition finds particular utility in the can industry where the composition can be applied to the interior of two-piece drawn-and-ironed and three-piece beer and beverage cans, to the exterior of three-piece beer and beverage cans, to the interior and/or exterior ends of two- or three-piece cans or two- or three-piece sanitary cans. When the coating composition of this invention is applied to the interior of food and beer or beverage cans by electrocoating, a thin uniform film is deposited which, after curing, corresponds to a coating weight of 0.08 to 1.3 milligrams per square centimeter (0.5–8 milligrams per square inch). Coatings utilized as an interior enamel have excellent taste and odor characteristics; that is to say, low extractables and sorption to prevent taste adulteration.

The water-borne composition of the invention can also be electrocoated, especially when crosslinked with a nitrogen resin, for use in automatic primer, appliance finish, and coil coating applications, the final coated articles having especially desirable hardness and acid, base, solvent, and detergent resistant to salt spray and "processing." This latter property is tested in a steam-pressure cooker at approximately 120° C.

The invention is further illustrated by the following examples.

EXAMPLE 1

(A)

To a suitable reactor is charged the following parts by weight:

| | |
|---|---|
| Styrene | 83.318 |
| Ethyl Acrylate | 78.868 |
| Methacrylic Acid | 71.850 |
| Acetone | 35.226 |
| Monobutyl Ether of Ethylene Glycol | 81.076 |
| Normal Butanol | 28.518 |

The charge is heated to 85° C. and the heat is turned off. A solution of 1.403 parts of tertiary butyl peroxy isobutyrate in 2.349 parts of monobutyl ether of ethylene glycol is added and the batch exotherms to reflux temperature and is held there for ninety minutes. A second addition of 1.403 parts of tertiary butyl peroxy isobutyrate in 2.349 parts of monobutyl ether of ethylene glycol is added rapidly and reflux is maintained for an additional 60 minutes. A third addition of 1.403 parts of tertiary butyl peroxy isobutyrate in 2.349 parts of monobutyl ether of ethylene glycol is added rapidly and reflux is maintained for an additional 60 minutes. 69.890 parts of normal butyl alcohol and 43.611 parts of monobutyl ether of ethylene glycol are added. 35.226 parts of acetone is removed by distillation. The acid number of the product is 200.

(B)

To a suitable reactor is charged the following parts by weight:

| | |
|---|---|
| "Epon 829" | 1846.0 |
| Bisphenol A | 982.0 |
| Monobutyl Ether of Ethylene Glycol | 240.0 |

The charge is heated to 130°–140° C. and allowed to exotherm to about 200° C. Temperature is maintained above 125° C. for two hours after peak exotherm temperature is reached. 386.0 parts of hexyl cellosolve are added to act as a coalescing aid.

The "Epon 829" has an epoxy equivalent weight of about 195, and it is chain-extended by the bisphenol A to an epoxy equivalent weight of about 3000.

The batch is cooled to 100° C. 1192.0 parts of the acrylic polymer prepared in A are added. The batch is mixed for 30 minutes. 138.4 parts of dimethylethanol amine and 552 parts of deionized water are added. The batch is maintained at 80°–85° C. for 25 minutes. 6548.0 parts of deionized water, preheated to 80° C. are added evenly over a 1-hour period, and the batch is mixed an additional 30 minutes.

The resulting product contained about 82% epoxy resin and 18% acrylic resin, by weight, with an equivalent ratio of acid polymer/amine/epoxy of about 2.3/1.7/1.

EXAMPLE 2

(A)

Into a suitably equipped kettle, inerted with nitrogen, are added the following parts by weight:

| | |
|---|---|
| Monobutyl Ether of Ethylene Glycol | 91.567 |
| Normal Butanol | 32.503 |
| Ethyl Acrylate | 14.453 |
| Tertiary Butyl Penbenzoate | 0.026 |

In a separate vessel, the following are added and mixed:

| | |
|---|---|
| Ethyl Acrylate | 54.764 |
| Methacrylic Acid | 122.060 |
| Styrene | 72.919 |
| Normal Butanol | 2.050 |
| Tertiary Butyl Perbenzoate | 2.351 |

The reactor is heated to reflux and the monomer mixture is added evenly to the refluxing reactor over a two-hour period. Then 7.932 parts of monobutyl ether of ethylene glycol are added as a rinse for monomer feed lines. Reflux is maintained for one hour, at which point 55.500 parts of normal butanol is added. Reflux temperatures are maintained for an additional hour at which point the heat is turned off and 72.623 parts of normal butanol are added, followed by 82.312 parts of dimethyl ethanol amine and 246.940 parts of deionized water. The product is a solution of a styrene/ethyl acrylate/methacrylic acid//27.6/26.2/46.2 polymer at 30.8% solids in solvent, water and amine. The acid number of the product is 300.

(B)

Into a suitably equipped kettle, inerted with nitrogen, are added the following parts by weight:

| Monobutyl Ether of Ethylene Glycol | 8.400 |
|---|---|
| "Epon 829" | 86.978 |
| Bisphenol A | 46.835 |

The kettle charge is heated to 130°–140° C., heat removed and allowed to exotherm to 175°–200° C. After the exotherm is exhausted, heat is applied and the reaction mass is maintained above 165° C. for two hours after peak exotherm. At this point, a sample can be removed for determination of completion of reaction. Theoretical epoxy equivalent weight is 3000. 6.655 parts of monobutyl ether of ethylene glycol and 27.366 parts of normal butanol are added to dilute the reaction mass and cool it to 100° C.

121.131 parts of the neutralized acrylic polymer prepared in (A) are added rapidly following by 23.181 parts of deionized water. The mass is heated to reflux temperature and held for twenty-five minutes. Heat is turned off and 288.155 parts of deionized water, preheated to 70°–80° C. is added evenly over a one-hour period. This dispersion is isolated here at 28% solids.

The resulting product contained about 77.8% epoxy resin and 22.2% acrylic resin, by weight, with an equivalent ratio of acid polymer/amine/epoxy of about 4.6/3.0/1.0. X was 3, and Y was 51.5.

EXAMPLE 3

A concentrate used to initially charge or replenish solids in an electrocoating tank is prepared by adding 34.72 parts of "Beetle 80", a butylated urea formaldehyde made by American Cyanamid Co., 88.96 parts of hexyl cellosolve and 228.16 parts of deionized water to 648.16 grams of Example I (B) in a suitable reactor. The batch is mixed for one half hour. A dispersion with a pH=9.2, conductivity=890 μmho/cm or μsiemens, a milliequivalent of carboxyl-amine salt per 100 gm of solids=15.4, and a low shear viscosity of 675 cps is obtained.

4461.8 grams of deionized water are added to 2538.2 grams of the above to dilute the concentrate to electrocoating solids of 8.0 weight percent. An aluminum end stock panel was electrocoated from this dilution at a preset constant, voltage of 150 for 2 seconds. After a suitable bake, a smooth glossy film with a coating weight of 3.4 milligrams per inches squared was obtained. This film gave 50 methyl ethyl ketone rubs, showed no blush and excellent adhesion after 30 minutes exposure to boiling water and showed excellent protection when fabricated into a can end. This system has a coulomb yield of 67.3 milligrams per coulomb.

EXAMPLE 4

36.29 grams of 2-ethyl hexanol was added to 1778 grams of Example 2(B) to give a concentrate which can be diluted into an electrocoating bath. 290.0 grams of this concentrate were diluted with 709.1 grams of deionized water to give an electrocoating bath at 8.0 weight percent solids. This material was electrocoated anodically at 150 volts for 3 seconds on untreated, cleaned only, aluminum can end stock on a continuous coil line at 20 ft./min to give a glossy coating with a film weight of 3.5 mg/in$^2$. The coating was cured at 204° C. effective metal temperature for 6 seconds. The film gave 30 methyl ethyl ketone rubs, and excellent adhesion and no blush after 30 minutes' exposure to boiling water. The coated aluminum was made into can ends and the film withstood the fabrication process with very little loss of film continuity. These ends, when placed into cans, did not effect the taste of the contents of the containers.

EXAMPLE 5

In a suitable container, 16.72 parts of "Beetle 80" and 7.88 parts of monohexyl ether of ethylene glycol (hexyl cellosolve) are added to 375.40 parts of Example 2(B). This material was diluted to 8.0 weight percent solids by adding 72.95 parts of deionized water to 27.05 of the blend. This material was used to anodically electrocoat the interior of an aluminum D.I. can at 50 volts for a coating time of 500 milliseconds. A clear glossy coating at 0.7 mg/in$^2$ was obtained after a suitable bake. The coated can gave an enamel rater of 5.0 milliamps and passed all the film and taste tests.

COMPARATIVE TEST 1

Certain tests were performed to determine the relative merits of water-borne coating compositions used in the invention with the minimum claimed level of an acid number of 100 and epoxy content of 50% versus comparable compositions outside the invention with an acid number of 65 and an epoxy content of 40%. Minor adjustments had to be made in the equivalent ratios of acid polymer/amine/epoxy in order to accommodate the difference in acid number and epoxy content.

(A)

Compositions of the invention were represented by the reaction product of 50% of an acid polymer with an acid number of 100 made of

| styrene | 42.4 |
|---|---|
| ethyl acrylate | 42.3 |
| methacrylic acid | 15.3 | and 50% of "Epon 1007" epoxy resin with an average epoxy equivalent weight of about 2175, analyzed at 2368. The acid polymer had been neutralized with enough dimethyl ethanol amine to give theoretical equivalent ratios of acid polymer/amine/epoxy of 3.87/3.87/1 and actual analyzed ratios of 4.21/4.21/1. X was 2.175; Y was 66.1.

(B)

Compositions outside the invention were represented by the reaction product of 60% of an acid polymer with an acid number of 65 made of

| styrene | 45 |
|---|---|
| ethyl acrylate | 45 |
| methacrylic acid | 10 | and 40% of "Epon 1007" epoxy resin. The reaction product was made in the same manner as in (A) above with enough dimethyl ethanol amine to give theoretical equivalent ratios of acid polymer/amine/epoxy of 3.79/3.79/1 and actual analyzed ratios of 4.13/4.13/1. X was 2.175, and Y was 51.1.

The compositions of (B) were significantly less stable than those of (A). (B) separated by settling in 2–3 weeks under ordinary laboratory conditions, while (A) remained well dispersed. Although (B) could be redispersed by stirring, this settling would be expected to be more severe under stress conditions such as freezing and thawing. Such a lack of stability is undesirable and probably commercially unacceptable when a stable product is available.

COMPARATIVE TEST 2

By empirically testing a large number of different compositions, it has been determined that a relationship exists between the epoxy equivalent weight and the milliequivalents (MEQ) of amine-neutralized carboxylic acid polymer for obtaining a stable dispersion. This relationship is expressed by a curve wherein Y is $6+0.75(2^X)$, wherein Y is the milliequivalent of carboxyl groups neutralized with primary, secondary or tertiary amine or monofunctional quaternary ammonium hydroxide per 100 grams of acid polymer plus epoxy, and X is the epoxy equivalent weight divided by 1000. The curve represents the approximate locus of borderline stability. Above the curve, the compositions are stable if the other conditions of the invention are met including the acid number and the epoxy equivalent weight; below the curve, they are not. Although there is some flexibility in the precise location of the curve, it lies approximately where this definition puts it.

Data points of borderline stability have been determined as follows:

| X | Y |
|---|---|
| 0 | 6¾ |
| 1 | 7½ |
| 2 | 9 |
| 3 | 12 |
| 4 | 18 |

What is claimed is:

1. In a process of electrocoating an electrically conductive surface serving as an anode which comprises passing electric current between said anode and a cathode in contact with an aqueous electrodepositable composition, the improvement wherein said electrode-positable composition comprises a water-borne coating composition consisting essentially of liquid carrier and the reaction product of:
   (A) not less than 50% by weight, based on the weight of (A) plus (B), of an epoxy resin containing, on the average, two terminal 1,2-epoxy groups per molecule and having an epoxy equivalent weight of 750–5000;
   (B) a carboxyl-functional polymer in an amount sufficient to provide at least 1.25 equivalents of carboxyl groups, when the source of the carboxyl group is a mono-protic acid, and at least 2.0 equivalents of carboxyl groups, when the source of such groups is a diprotic acid, per equivalent of 1,2-epoxy groups in the epoxy resin, said polymer having a weight average molecular weight (determined by light scattering) of about 5000–160,000 and an acid number of 100–500;
   (C) an aqueous solution of at least 1.25 equivalents of a tertiary amine per equivalent of 1,2-epoxy groups in the epoxy resin, said tertiary amine being selected from the group consisting of $R_1R_2R_3N$, pyridine, N-methylpyrrole, N-methyl piperidine, N-methyl pyrrolidine, N-methyl morpholine, and mixtures thereof and wherein $R_1$ and $R_2$ are substituted or unsubstituted monovalent alkyl groups containing one or two carbon atoms in the alkyl portion and $R_3$ is a substituted or unsubstituted monovalent alkyl weight divided by 1000; and
   (E) optionally, 10–90% of the amount required for stoichiometric reaction with the carboxyl-functional polymer of (B) of at least one primary, secondary or tertiary amine or monofunctional quaternary ammonium hydroxide;
wherein for increasing ratios of carboxyl groups to 1,2-epoxy groups, the amount of amine is increased to keep the carboxyl-functional polymer water dispersible.

2. The process of claim 1 wherein components (A), (B) and (C) comprise about 1–50% by weight of the coating composition and the remainder is comprised of the liquid carrier which is water and, optionally, organic liquid in a volume ratio of from 90:10 to all water.

3. The process of claim 2 wherein components (A), (B) and (C) comprise about 1–20% by weight of the coating composition and the remainder is comprised of the liquid carrier which is water and, optionally, organic liquid in a volume ratio of from 90:10 to all water.

4. The process of claim 3 wherein the source of the carboxyl group is a mono-protic acid, and said carboxyl-functional polymer is present in an amount sufficient to provide at least 1.75 equivalents of carboxyl groups.

5. The process of claim 3 wherein said carboxyl-functional polymer is a polymer of at least one $\alpha,\beta$ethylenically unsaturated monomer and at least one $\alpha,\beta$-ethylenically unsaturated acid.

6. The process of claim 5 wherein said $\alpha,\beta$-ethylenically unsaturated acid is selected from the group consisting of acrylic acid, methacrylic acid, and itaconic acid.

7. The process of claim 1 wherein the electrocoating is conducted at a pH about in the range of 7–10.

8. The process of claims 1, 2, 3, 4, 5, or 6 wherein the coating composition additionally contains a coalescing aid which is at least partially water soluble.

9. The process of claim 8 wherein the coalescing aid is selected from the group consisting of ethylene glycol monohexyl ether, 2-ethyl hexanol and butanol.

10. The process of claims 1, 2, 3, 4, 5, 6 7 or 9 wherein the coating composition additionally contains a crosslinking agent which is at least one of phenol formaldehyde and a nitrogen resin.

* * * * *